(12) United States Patent
Reddy et al.

(10) Patent No.: US 8,540,025 B2
(45) Date of Patent: Sep. 24, 2013

(54) WELLBORE SERVICING COMPOSITIONS AND METHODS OF MAKING AND USING SAME

(75) Inventors: B. Raghava Reddy, Duncan, OK (US); Russell M. Fitzgerald, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 184 days.

(21) Appl. No.: 12/796,515

(22) Filed: Jun. 8, 2010

(65) Prior Publication Data

US 2011/0297378 A1    Dec. 8, 2011

(51) Int. Cl.
*E21B 33/13*    (2006.01)

(52) U.S. Cl.
USPC .......................................... 166/293; 166/300

(58) Field of Classification Search
None
See application file for complete search history.

(56) References Cited

U.S. PATENT DOCUMENTS

| | | | |
|---|---|---|---|
| 3,748,159 A | 7/1973 | George | |
| 4,500,357 A | 2/1985 | Brothers et al. | |
| 4,573,534 A * | 3/1986 | Baker et al. | 166/293 |
| 4,662,943 A | 5/1987 | Baker et al. | |
| 5,346,012 A | 9/1994 | Heathman et al. | |
| 5,588,488 A | 12/1996 | Vijn et al. | |
| 5,913,364 A | 6/1999 | Sweatman | |
| 6,167,967 B1 | 1/2001 | Sweatman | |
| 6,258,757 B1 | 7/2001 | Sweatman et al. | |
| 6,457,524 B1 | 10/2002 | Roddy | |
| 6,591,909 B1 | 7/2003 | Dao et al. | |
| 6,800,128 B2 | 10/2004 | Dao et al. | |
| 7,004,256 B1 | 2/2006 | Chatterji et al. | |
| 7,021,380 B2 | 4/2006 | Caveny et al. | |
| 7,077,203 B1 | 7/2006 | Roddy et al. | |
| 7,174,962 B1 | 2/2007 | Roddy et al. | |
| 7,244,303 B2 | 7/2007 | Chatterji et al. | |
| 7,285,165 B2 | 10/2007 | Caveny et al. | |
| 7,350,574 B2 | 4/2008 | Santra et al. | |
| 7,537,656 B2 | 5/2009 | Santra et al. | |
| 2005/0167104 A1 | 8/2005 | Roddy et al. | |
| 2005/0241542 A1 | 11/2005 | Hagen et al. | |
| 2007/0111897 A1 | 5/2007 | Dahanayake et al. | |
| 2011/0067867 A1 * | 3/2011 | Reddy et al. | 166/293 |

FOREIGN PATENT DOCUMENTS

| | | |
|---|---|---|
| JP | 2008274726 | 11/2008 |
| WO | 9611230 | 4/1996 |
| WO | 2011036438 A1 | 3/2011 |

OTHER PUBLICATIONS

Halliburton brochure entitled "CFR-3 cement friction reducer," 1998, 2 pages, Halliburton Energy Services, Inc.
Halliburton brochure entitled "Component R™," Feb. 2008, 2 pages, Halliburton.

(Continued)

*Primary Examiner* — Zakiya W Bates
(74) *Attorney, Agent, or Firm* — Craig W. Roddy; Conley Rose, P.C.

(57) ABSTRACT

A method of servicing a wellbore in a subterranean formation comprising preparing a wellbore servicing fluid comprising cement, water and a polyuronide polymer, placing the wellbore servicing fluid in the wellbore, and allowing the wellbore servicing fluid to set. A method of servicing a wellbore in a subterranean formation comprising preparing a wellbore servicing fluid comprising a highly methylated pectin, cementitious material and water into the wellbore, placing the wellbore servicing fluid in the wellbore, and allowing the wellbore servicing fluid to set. A wellbore servicing fluid comprising cement, water and a polyuronide polymer.

25 Claims, 3 Drawing Sheets

Structure 1A

(56) References Cited

OTHER PUBLICATIONS

Halliburton brochure entitled "Diacel LWL," 1999, 2 pages, Halliburton Energy Services, Inc.
Halliburton brochure entitled "HR®-6L," 1999, 2 pages, Halliburton Energy Services, Inc.
Halliburton brochure entitled "HR®-25," 1999, 2 pages, Halliburton Energy Services, Inc.
Halliburton brochure entitled "HR-800™ cement retarder ," Sep. 2007, 2 pages, Halliburton.
Halliburton brochure entitled "HR®-817 cement retarder," May 2009, 2 pages, Halliburton.
Halliburton brochure entitled "SSA-1," 1998, 2 pages, Halliburton Energy Services, Inc.
Foreign communication from a related counterpart application—International Search Report and Written Opinion, PCT/GB2011/000866, Sep. 12, 2011, 15 pages.
CP Kelco brochure entitled "Best Choices Guidelines: Personal Care Products," XP002612487, Apr. 2009, 4 pages.
Foreign communication from a related counterpart application—International Preliminary Report on Patentability, PCT/GB2011/000866, Dec. 10, 2012, 9 pages.

* cited by examiner

Structure 1A

Structure 1B

Structure 1C

Structure 2

Structure 3A                    Structure 3B

WELLBORE SERVICING COMPOSITIONS AND METHODS OF MAKING AND USING SAME

FIELD

This disclosure relates to servicing a wellbore. More specifically, it relates to servicing a wellbore with cement compositions comprising retarders and methods of making and using same.

BACKGROUND

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Cementitious slurries can set very rapidly, e.g., within a few minutes at elevated temperatures with the rate of reaction increasing as the temperature increases. As such, the thickening times of the compositions may be unacceptably short to allow them to be pumped to their desired downhole locations, making the use of such compositions in well cementing a challenge. For example, the drill pipe or the tool used to lower the piping in the wellbore may be cemented in place, causing delay in the completion of the wellbore. One method commonly employed to lengthen the thickening time of cementitious compositions is to introduce set retarders into the compositions, thereby delaying the time to setting of the cement. However, the effectiveness of many set retarders decreases with increasing temperature. Additionally, it is desirable that such set retarders are not harmful to the environment, and are biodegradable. For example the set retarders may be derived from natural sources and/or are of food-grade. Thus, an ongoing need exists for set retarders that pose less environmental risk and that function at elevated temperatures.

SUMMARY

Disclosed herein is a method of servicing a wellbore in a subterranean formation comprising preparing a wellbore servicing fluid comprising cement, water and a polyuronide polymer, placing the wellbore servicing fluid in the wellbore, and allowing the wellbore servicing fluid to set.

Also disclosed herein is a method of servicing a wellbore in a subterranean formation comprising preparing a wellbore servicing fluid comprising a highly methylated pectin, cementitious material and water into the wellbore, placing the wellbore servicing fluid in the wellbore, and allowing the wellbore servicing fluid to set.

Further disclosed herein is a wellbore servicing fluid comprising cement, water and a polyuronide polymer.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

Disclosed herein are wellbore servicing fluids (WSF) and methods of making and using same. In an embodiment, the WSF comprises a cementitious material and a polyuronide. The polyuronide may function to extend the thickening time of the cementitious composition wherein the thickening time refers to the time required for the composition to achieve 70 Bearden units of Consistency (Bc). Herein, the cementiceous materials refer to unset and unhydrated solid cement material that can be allowed to react with water, hydrate and form a set cement mass.

In an embodiment, the wellbore servicing fluid (WSF) comprises a cementitious material and a polyuronide. The term polyuronides may be used herein to refer to a broad class of polysaccharides which are naturally-occurring polymers of uronic acid. Uronic acid is a monomeric hexose in which the C-6 carbon is oxidized to a carboxylic acid group. Nonlimiting examples of polyuronides include alginates, pectinates and tragacanthic acid. Nonlimiting examples of uronic acids include galacturonic acid, glucuronic acid, guluronic acid, and mannuronic acid. In an embodiment, the WSF comprises a polyuronide with a molecular weight (MW) of from about 2000 Daltons to about 1,000,000 Daltons, alternatively from about 20,000 Daltons to about 500,000 Daltons, alternatively from about 60,000 Daltons to about 130,000 Daltons.

In one embodiment, the WSF comprises a polyuronide that is a derivative of alginic acid, alternatively an alginate, alternatively an alkali or alkaline earth metal salt of alginic acid. In an embodiment, the polyuronide is an alginate polymer. In an embodiment, the alginate polymer comprises an alginate salt. Nonlimiting examples of alginate salts suitable for use in this disclosure include potassium alginate, magnesium alginate, calcium alginate, triethanolammonium alginate and combinations thereof. Alternatively, the alginate can be used in the acid form, in combination with pH-adjusting buffers.

Figure 1A:
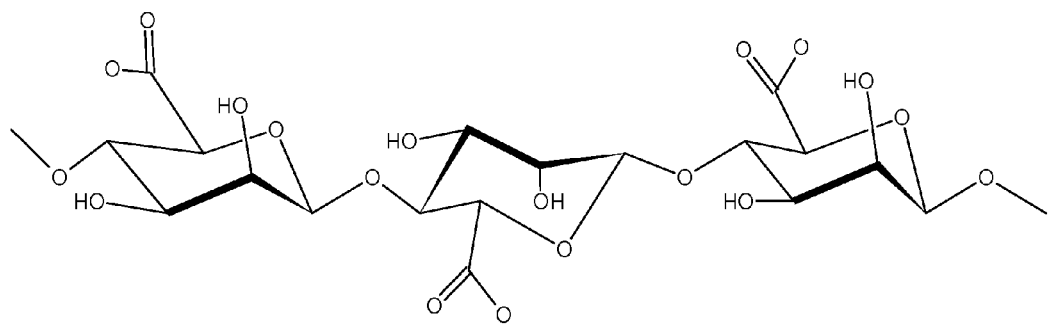
FIGS. 1A-1C are structures of alginate polymers.
Figure 1B:
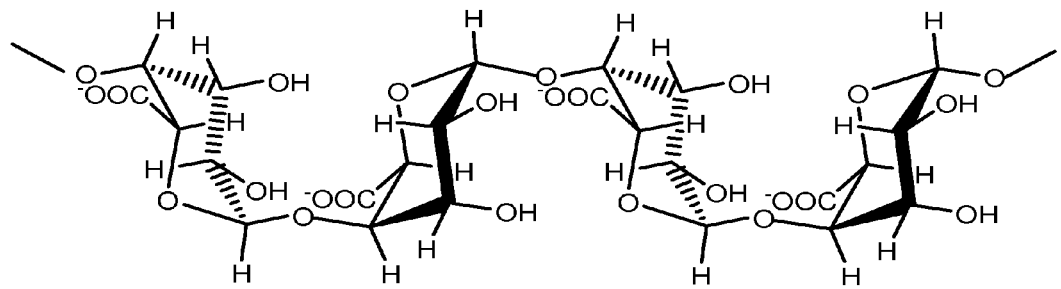
Figure 1C:
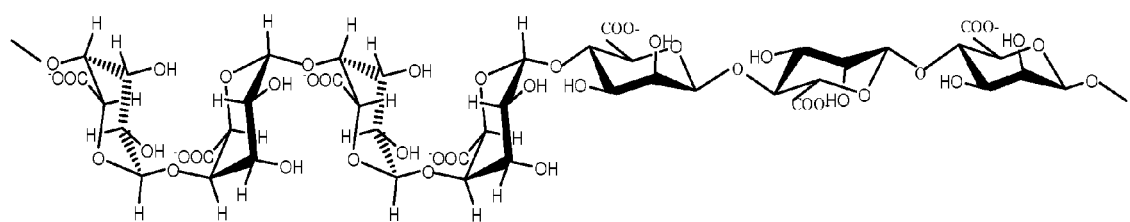

Alginate polymers may be isolated from kelp, sea weed and/or other sources containing monomeric units of alpha-L-guluronic acid (G unit) and beta-D mannuronic acid (M unit) and may be organized as: (1) homopolymeric M blocks (polymannuronate, an example of which is depicted in Structure 1A as shown in FIG. 1A); (2) homopolymeric G blocks (polyguluronate, an example of which is depicted in Structure 1B as shown in FIG. 1B); or (3) heteropolymeric G-M blocks with randomly arranged GG and MM block sequences (an example of which is depicted in Structure 1C as shown in FIG. 1C), alternating GM sequences; or any combination thereof.

An alginate suitable for use in the present disclosure may comprise heteropolymeric GM blocks and may have an M:G ratio of from about 2:8 to about 8:2 alternatively from about 3:7 to about 7:3, alternatively from about 4:6 to about 6:4. In an embodiment, the alginate is a high GG block alginate containing equal to or greater than about 25% GG blocks, alternatively equal to or greater than about 40% GG blocks, alternatively equal to or greater than about 50% GG blocks.

In an embodiment, the alginate polymer may be altered to meet some user and/or process need. For example, the alginate polymer may be altered enzymatically using epimerases. In an embodiment, the alginate polymer is chemically modified by esterification of native carboxylate groups with alcohols such as propylene glycol, ethylene glycol, and methanol. Methods and compositions for esterification of alginate polymers are known to one of ordinary skill in the art, with the benefits of this disclosure.

Examples of commercially available alginates suitable for use in this disclosure include, without limitation, KELCOLOID LVF, and KELCOLOID HVF (both available from FMC BioPolymer) which are alginates having a portion of the carboxylate groups esterified with propylene glycol and MANUGEL GHB (also available from FMC BioPolymer) which is a sodium alginate. In an embodiment, the WSF comprises an alginate polymer of the type described herein with a molecular weight (MW) of from about 14,000 Daltons to about 1,000,000 Daltons alternatively from about 100,000 Daltons to about 700,000 Daltons, alternatively from about 200,000 Daltons to about 500,000 Daltons.

Figure 2:
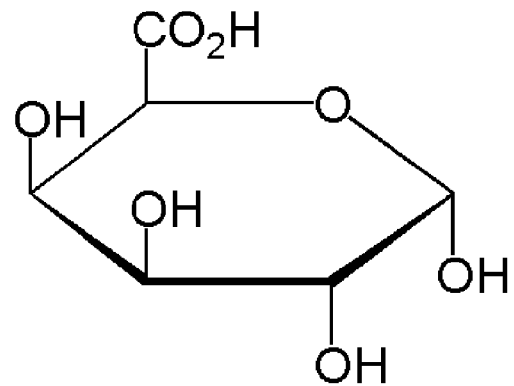
FIG. 2 is a structure of D-galacturonic acid.

In an embodiment, the WSF comprises a pectinate polymer. Chemically, pectin is a straight chain of α-D-galacturonic acid molecules linked by 1,4-glycosidic linkages which are all di-equatorial due to the C1 conformation. The structure of D-galacturonic acid is shown in FIG. 2 (Structure 2).

The carboxylate groups in native pectinates are present predominantly as methyl esters with varying degrees of methylation. Pectinate polymers, depending on the degree of methylation may either form clear solutions (high-methylation) or turbid suspensions with low viscosity (low methylation). Herein, a high degree of methylation refers to from about 50% to about 80% of the C6-COOH being present as the methyl ester, while a low degree of methylation refers to methylation of less than about 50% of the carboxylic acid groups present as the methyl ester. The remaining non-methylated carboxylic acid groups may be present as free —COOH groups, or as sodium, potassium, calcium or ammonium groups. In an embodiment, a portion of the methyl ester groups may be reacted with ammonia to form an amide group and, as a result of this reaction; the resulting polymer may contain amide groups, methyl ester groups and carboxylic acid groups or the salt form of the carboxylic acid groups. In an embodiment, a pectinate suitable for use in this disclosure has a degree of methylation of from about 50% to about 80%, alternatively greater than about 55%, alternatively greater than about 65%. In an embodiment, pectinates suitable for the present disclosure may include any combination of C6-amide groups and C6-methyl ester groups, provided that the sum of amide and ester groups are within the above disclosed ranges.

In an embodiment, the WSF comprises a metal salt of a pectinate polymer. In an embodiment, the WSF comprises an alkali metal salt of a pectinate polymer, alternatively a sodium or potassium salt of a pectinate polymer or combinations thereof. In an embodiment, the WSF comprises sodium pectinate. The sodium salts of pectinates may be highly water soluble, partially water soluble, or water dispersible depending on a variety of factors such as the degree of methylation, the type of other solids present, pH, and/or other factor that affects the solubility of the pectinates.

Examples of commercially available pectinates suitable for use in this disclosure include without limitation GENU X-914 (low methylation) and GENU PECTIN (Citrus) USP/100 (high-methylation) each of which are available from CP Kelco Inc. Pectinate polymers are also used in preparation of fruit jams and jellies. Food grade pectin, which also contains citric acid and glucose, is available in stores under the trade name SURE JELL (available from Kraft Foods, Inc.).

In an embodiment, the WSF comprises a pectinate polymer with a MW of from about 30,000 Daltons to about 1,000,000 Daltons, alternatively from about 70,000 Daltons to about 700,000 Daltons, alternatively from about 60,000 Daltons to about 250,000 Daltons.

Figure 3:
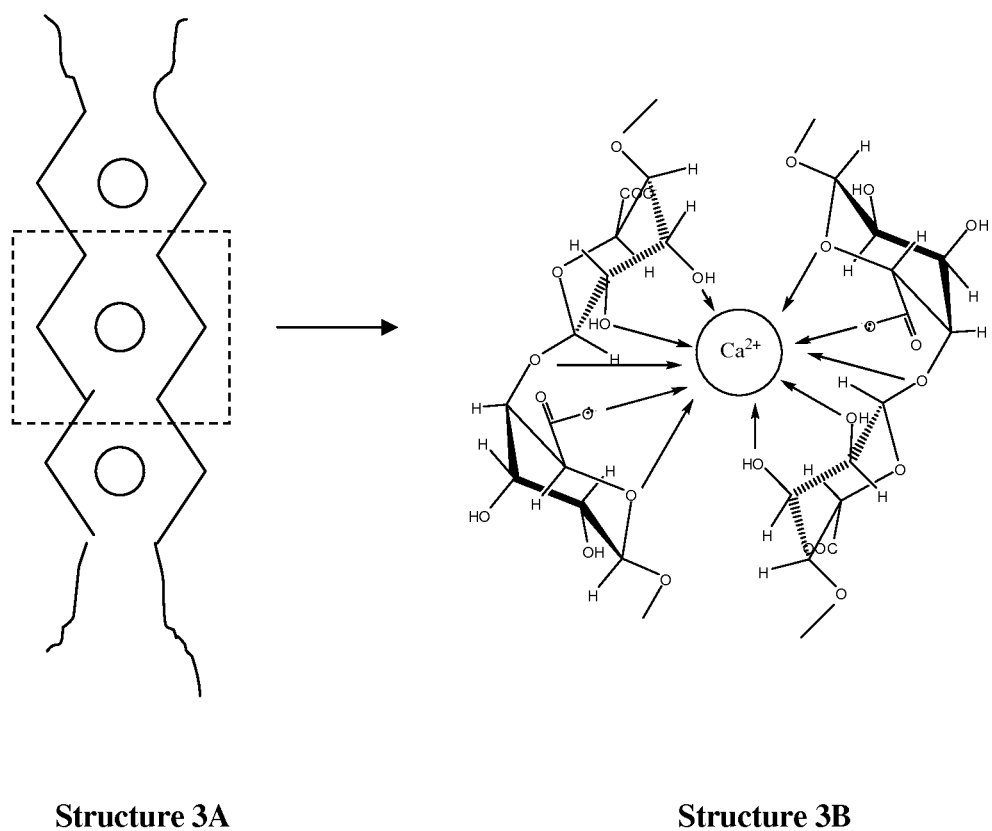
FIG. 3 is a graphical representation of an egg-crate structure and an expanded view of such graphical representation.

Polyuronides (e.g., alginates, pectinates) suitable for use in the disclosure may be further characterized by their ability to form "egg-crate" structures when contacted with a Group II metal ion (e.g., $Ca^{2+}$, $Mg^{2+}$) Turning to FIG. 3, without wishing to be limited by the accuracy or precision of the images, Structure 3A is a graphical representation of an egg-crate structure formed by contacting calcium with an alginate to form calcium alginate. In Structure 3A, the circles represent $Ca^{2+}$ ions. Structure 3B is an expanded view of a graphical representation of a portion of the calcium alginate structure depicted in Structure 3A.

In an embodiment, the WSF comprises a polyuronide which is present in an amount of from about 0.1 wt. % to about 5 wt. %, alternatively from about 0.5 wt. % to about 3 wt. %, alternatively from about 0.75 wt. % to about 1.5 wt. % based on the weight of cement.

In an embodiment, the WSF comprises a cementitious material such as a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Examples of such materials are disclosed in U.S. Pat. Nos. 6,457,524; 7,077,203; and 7,174,962, each of which is incorporated herein by reference in its entirety. The WSF may comprise cementitious material in an amount of from about 30 wt. % to about 84 wt. %, alternatively from about 40 wt. % to about 70 wt. % alternatively from about 50 wt. % to about 60 wt. % by total weight of cement and water.

The WSF may include a sufficient amount of water to form a pumpable slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement, alternatively from about 36 to about 66 percent by weight of cement. The cement may have a density of from about 7 pounds per gallon (ppg) to about 20 ppg, alternatively from about 10 ppg to about 18 ppg, alternatively from about 13 ppg to about 16 ppg.

In an embodiment, the WSF may further comprise one or more additives or modifying agents as deemed necessary to impart desired physical properties. Such additives may include but are in no way limited to fluid absorbing materials, resins, aqueous superabsorbers, viscosifying agents, suspending agents, dispersing agents, salts, accelerants, surfactants, retardants, defoamers, settling-prevention agents, weighting materials, dispersants, vitrified shale, formation conditioning agents, or other additives or modifying agents, and/or combinations thereof. These additives may be included singularly or in combination. Methods of incorporating these additives into the WSF, as well as their effective amounts, are known to those of ordinary skill in the art.

In an embodiment, a WSF of the type described herein comprises cementitious material, water, and a polyuronide all of the type and all present in amounts previously described herein. Alternatively, a WSF of the type described herein comprises cementitious material, water, and a high methylation pectin. A WSF containing cementitious material, water, and a polyuronide is hereinafter designated WSF-X.

The components of the WSF-X may be combined in any order desired by the user to form a slurry that may then be placed into a wellbore and allowed to set. For example, components of the WSF-X may be combined using any mixing device compatible with the composition, for example a bulk mixer or a recirculating mixer. In some embodiments, the WSF-X is formed by premixing the polyuronide with the cementitious material prior to the addition of other components of the WSF-X. For example, a method of preparing the WSF-X may comprise dry blending a cementitious material with a polyuronide both of the type described previously herein. In an embodiment, the cementitious material and polyuronide are contacted with any dry components of the wellbore servicing composition prior to the introduction of a liquid component.

In an embodiment, a WSF-X is employed in a wellbore servicing operation wherein the composition is utilized at temperatures equal to or less than about 300° F., alternatively less than about 230° F. In such embodiments, the WSF-X may exclude other set retarders thereby allowing the polyuronide to function as the primary retarder. In such embodiments, the WSF-X may display a thickening time of from about 1 hr to about 40 hrs, alternatively from about 3 hrs to about 12 hrs, alternatively from about 4 hrs to about 8 hrs at a temperature in the range of equal to or less than about 300° F.; alternatively less than about 250° F.; or alternatively less than about 230° F.

In an embodiment, the WSF-X may comprise an additional retarder. Nonlimiting examples of additional retarders suitable for use in this disclosure include lignosulfonates, copolymers of 2-acrylamido-2-methylpropane sulfonic acid with acrylic acid or itaconic acids, maltodextrins, sulfonated aromatic polymers, combinations thereof and the like. Additionally, small molecule inorganic retarders for example sodium tetraborate (borax) may also be used in conjunction with polyuronides of the type described herein. In an embodiment, the additional retarder excludes small molecule carboxylic acid type retarders such as tartaric acid, citric acid and gluconic acid.

It is contemplated a WSF-X comprising an additional retarder may be designed by one of ordinary skill in the art with the benefits of this disclosure to meet one or more user and/or process desired needs. For example, the additional retarders may be advantageously employed to provide the WSF-X with some user and/or process desired thickening times over extended temperature ranges. In an embodiment, the WSF-X comprising a polyuronide and an additional retarder may be utilized at temperatures greater than about 230° F., alternatively greater than about 300° F. Such compositions may have a thickening time of from about 1 hr to about 40 hrs, alternatively from about 3 hrs to about 12 hrs, alternatively from about 4 hrs to about 8 hrs at a temperature in the range of equal to or greater than about 230° F.; alternatively from about 250° F. to about 450° F.; alternatively from about 300° F. to about 400° F.

In an embodiment, a WSF-X of the type described herein comprises at least one other material which substantively influences the thickening time of the WSF-X. The weight ratio of polyuronide to additional retarder may range from 1:10 to 10:1. Alternately, the weight ratio may range from 1:4 to 4:1, alternately from 1:2 to 2:1.

In an embodiment, the WSF-X displays desirable rheological behavior. For example, when the WSF-X is sheared and/or heated, the composition may display shear thinning or pseudo-plastic behavior wherein the viscosity of the composition decreases with increasing shear rate. Such shear thinning rheological behavior of cement slurries is expected to provide non-settling cement slurries when the slurry is static after placement, and yet facilitate a faster cementing process at higher pump rates without exceeding fracture pressures of the formation, at lower pump pressures. The WSF-X slurries exhibiting the beneficial shear thinning behavior will have low shear stresses at high shear rates, and high shear stresses at low shear rates. In an embodiment, the WSF-X exhibits a shear stress at a shear rate of 511 $sec^{-1}$ of equal to or less than about 150 Pa (313.5 lbf/100 $ft^2$), alternately less than about 100 Pa (209 lbf/100 $ft^2$), and alternately less than about 75 Pa (156.8 lbf/100 $ft^2$). In an embodiment, the WSF-X displays a shear stress at a shear rate of 5.11 $sec^{-1}$ of equal to or greater than about 3 Pa (6.27 lbf/100 $ft^2$), or alternately equal to or greater than about 5 Pa (10.5 lbf/100 $ft^2$), or alternately equal to or greater than about 10 Pa (20.9 lbf/100 $ft^2$). The ratio of shear stresses at 511 $sec^{-1}$ to that at 5.11 $sec^{-1}$ may range from about 30:1 to 2:1, alternatively from about 15:1 to 3:1, alternatively from about 10:1 to 5:1. The above rheological parameters may be determined using any suitable methodology such as for example rotational viscometry. As will be understood by one of ordinary skill in the art, additional rheological characteristics of the WSF-X may be determined. For example, using the rotational viscometry to determine the shear stress may afford the determination of additional property specifications, such as yield point (YP), plastic viscosity (PV), Consistency Index (k). The Power Law flow behavior index or Ostwald Index (n) may also be calculated using different rheological models which nonlimiting examples of which include Bingham Plastic Model, Power Law model, Hershel Buckley model and the like. As will be understood by one of ordinary skill in the art with the benefits of this disclosure, using the above specifications (as determined for example by rotational viscometry) field cementing process parameters, such as pump rates, well bore and pipe dimensions, Reynold's numbers, friction factors and the like may be calculated as described in ANSI/API Recommended Practice 10-B2 (Formerly 10-B), First Edition, July 2005. In an embodiment, a WSF-X of the type described herein may be designed such that the composition displays the hereto described properties and advantageously can be pumped in turbulence.

The compositions disclosed herein may be used as wellbore servicing fluids. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids, all of which are well known in the art. It is to be understood that "subterranean formation" encompasses both areas below exposed earth and areas below earth covered by water such as ocean or fresh water.

In an embodiment, the WSF-Xs may be employed in well completion operations such as primary and secondary cementing operations. The WSF-X may be placed into an annulus of the wellbore and allowed to set such that it isolates the subterranean formation from a different portion of the wellbore. The WSF-X thus forms a barrier that prevents fluids in the subterranean formation from migrating into other subterranean formations. Within the annulus, the WSF-X also serves to support a conduit, e.g., casing, in the wellbore. In an embodiment, the wellbore in which the WSF-X is positioned belongs to a multilateral wellbore configuration. It is to be understood that a multilateral wellbore configuration refers to a primary wellbore with one or more secondary wellbore branches radiating from the primary borehole.

In secondary cementing, often referred to as squeeze cementing, the sealant composition may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

The WSF-X may be introduced to the wellbore to prevent the loss of aqueous or non-aqueous drilling fluids into loss-circulation zones such as voids, vugular zones, and natural or induced fractures while drilling. In an embodiment, the WSF-X is placed into a wellbore as a single stream and activated by downhole conditions to form a barrier that substantially seals loss circulation zones. In such an embodiment, the WSF-X may be placed downhole through the drill bit forming a composition that substantially eliminates the lost circulation. Methods for introducing compositions into a wellbore to seal subterranean zones are described in U.S. Pat. Nos. 5,913,364; 6,167,967; and 6,258,757, each of which is incorporated by reference herein in its entirety.

The WSF-X, after hardening, may form a non-flowing, intact mass with good strength and capable of withstanding the hydrostatic pressure inside the loss-circulation zone. Said WSF-X may plug the zone and inhibit the loss of subsequently pumped drilling fluid thus allowing for further drilling.

The WSF-Xs as disclosed herein may provide numerous advantages in wellbore servicing operations. As described herein, extended thickening times, shear-thinning, and reduced high shear viscosity and non-settling at low shear rates may be achieved when the WSF-X is employed as described herein. In addition, the polyuronides of the WSF-X are derived from natural polymers which advantageously are commercially available and environmentally friendly as polyuronides of food grade can be utilized. Such compositions comprising a polyuronide of the type described herein may be utilized in downhole applications with substantially reduced concerns of contaminating groundwater or otherwise producing negative environmental impact.

EXAMPLES

The following examples are given as particular embodiments of the disclosure and to demonstrate the practice and advantages thereof. It is understood that the examples are given by way of illustration and are not intended to limit the specification or the claims in any manner.

Example 1

The effects of including a polyuronide of the type described herein on a cement slurry were investigated. Specifically, thirteen cement samples, designated Samples 1 to 13, were prepared to a density of 16.4 pounds/gallon (ppg). The sample components and amounts of each component are presented in Table 1. Referring to Table 1, SSA-1 silica flour, HR-25 organic acid containing retarder, HR-6L cement retarder, COMPONENT R cement retarder enhancer, and CFR-3 cement friction reducer, are each commercially available from Halliburton Energy Services. The thickening time, viscosity, and fluid loss for each sample was determined. The viscosity of the slurry samples was determined using a FANN 35 viscometer at the RPMs indicated in Table 2 at either 80° F. or 160° F. after conditioning the slurries at a test temperature for 20 minutes. The Comparative Example 1 containing no retarders was not tested for rheological measurements at 160° F. because the thickening time for this slurry at this temperature is too short for rheological measurements. Shear rates in $sec^{-1}$ were calculated by multiplying the rpm values by 1.703. Shear stresses in Pascals at different rpm values were obtained by multiplying the FANN 35 values by 0.51. The compressive strength of the set samples was also determined. Herein, the compressive strength is defined as the capacity of a material to withstand axially-directed pushing forces. The maximum resistance of a material to an axial force is determined in accordance with API Recommended Practices 10B, Twenty-Second Edition, December 1997. Beyond the limit of the compressive strength, the material becomes irreversibly deformed and no longer provides structural support and/or zonal isolation. The compressive strength a cement formation attains is a function of both the cement maturity (and cure time) and the temperature at which setting occurs. The cement maturity specifically refers to the time the cement formulation is allowed to set. With regard to temperature, the lower the temperature, the longer the time required for the cement composition to attain compressive strength.

TABLE 1

| | 1 | 2 | 3 | 4 | 5 | 6 | 7 | 8 | 9 | 10 | 11 | 12 | 13 |
|---|---|---|---|---|---|---|---|---|---|---|---|---|---|
| Water, % bwoc | 39.1 | 39.1 | 39.1 | 39.1 | 39.1 | 39.1 | 39.1 | 38.1 | 37.8 | 37.5 | 47.8 | 47.1 | 47.1 |
| SSA-1 | | | | | | | | | | | 35 | 35 | 35 |
| Genu X-914 % bwoc | 0.25 | | | | | | | | | | | | |
| Genu USP/100 % bwoc | | 0.25 | 0.25 | 0.25 | 0.5 | 1.0 | 0.5 | 0.8 | 0.5 | 0.8 | 0.8 | 0.8 | 0.8 |
| HR-6L (% bwoc) (lignosulfonate) | | | | | | | | 1.25 (0.5%)[1] | 2.00 (0.8%)[1] | 2.00 (0.8%)[1] | | 1.25 | 1.25 |
| HR-25 (tartaric acid) | | | | | | | | | | | 0.2 | | 0.25 |
| Component R | | | | | | | | 0.5 | | | | | |
| Temperature ° F. | 160 | 160 | 200 | 240 | 240 | 300 | 300 | 300 | 300 | 300 | 300 | 300 | 300 |
| Thickening time, hrs:min | 1:53 | 40 | 16:1 | 2:11 | 5:53 | 3:20 | 4:45 | 3:20 | 1:40 | 4:10 | gelled | 2:40 | gelled |

TABLE 1-continued

| | 1 | 2 | 3 | 4 | 5 | 6 | 7 | 8 | 9 | 10 | 11 | 12 | 13 |
|---|---|---|---|---|---|---|---|---|---|---|---|---|---|
| Fluid loss, cc/30 min | 986 | 1051 | | | | | | | | | | | |
| Compressive strength, psi @300° F. | | | | | | | | | | | | 7270 psi (crush) 5200 psi (UCA) 1170 psi @12 hrs 4860 psi @24 hr 50 psi @ 8:02 500 psi @ 8:44 | |

[1]active lignosulfonate as % bwoc

Note-
Strength development rate by UCA between 6.7 hrs and 23 hrs is about 300 psi/hr (average).
The rate of strength development between 50 psi and 500 psi is 640 psi/hr (see time to 50 psi and 500 psi values)

TABLE 2

| | Slurry #1 | Slurry #2 | Comparative Example 1 (Note 1) |
|---|---|---|---|
| Rheology at 80° F. | | | |
| 600 | 140 | 142 | |
| 300 | 101 | 94 | 82 |
| 200 | 87 | 78 | 66 |
| 100 | 69 | 59 | 50 |
| 60 | 60 | 50 | 43 |
| 30 | 51 | 42 | 38 |
| 6 | 27 | 24 | 21 |
| 3 | 19 | 18 | 17 |
| Rheology at 160° F. | | | |
| 600 | 140 | 147 | |
| 300 | 113 | 113 | |
| 200 | 99 | 101 | |
| 100 | 85 | 84 | |
| 60 | 77 | 75 | |
| 30 | 65 | 62 | |
| 6 | 29 | 29 | |
| 3 | 22 | 22 | |

(Note 1) - Prepared from Class H cement and water only. No retarders were used

The results demonstrate that a polyuronide of the type described herein may function as a cement retarder over a broad range of application temperatures. In contrast, samples comprising conventional retarders, such as HR-800 non-lignin cement retarder or HR-817 non-lignin cement retarder, which are commercially available from Halliburton Energy Services, when used alone are less effective cement retarders than the compositions of this disclosure. For example, cement slurry samples which were prepared as described herein using 0.6% bwoc HR-800 or HR-817 non-lignin cement retarder at 206° F. had a thickening time of 9:00 hrs while at 0.3% bwoc the thickening time of these compositions was 3:02 hrs:min. In contrast, cement slurries comprising a polyuronide (i.e., WSF-X) when used in amounts of 0.25% bwoc and at 200° F., for example sample 3, had a thickening time of 16:1 hrs:mins. Thus, the thickening time of the cementitious slurry comprising a polyuronide increased by 5.3 times when compared to an otherwise similar slurry containing a conventional retarder. Additionally, analysis of the rheological data presented in Table 2 demonstrates the samples comprising a polyuronide displayed the unexpectedly beneficial characteristic of being shear thinning. The shear-thinning behavior of samples comprising a polyuronide suggests that the slurry samples experience little-to-no settling when the slurry is static (low rpm values) and/or at low pump pressures and/or at high pumping rates (low viscosity values at 300-600 rpm).

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Whenever a numerical range with a lower limit and an upper limit is disclosed, any number and any included range falling within the range are specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Use of the term "optionally" with respect to any element of a claim is intended to mean that the subject element is required, or alternatively, is not required. Both alternatives are intended to be within the scope of the claim. Use of broader terms such as comprises, includes, having, etc. . . . , should be understood to provide support for narrower terms such as consisting of, consisting essentially of, comprised substantially of, etc. Also, the terms in the claims have their plain, ordinary meaning unless otherwise explicitly and clearly defined by the patentee.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore in a subterranean formation comprising:
    preparing a wellbore servicing fluid comprising cement, water and a polyuronide polymer;
    placing the wellbore servicing fluid in the wellbore; and
    allowing the wellbore servicing fluid to set wherein the wellbore servicing fluid has a thickening time of from about 1 hour to about 40 hours at a temperature of from about equal to or less than about 300° F.

2. The method of claim 1 wherein the polyuronide polymer is present in an amount of from about 0.1 wt. % to about 5.0 wt. % by weight of the wellbore servicing fluid.

3. The method of claim 1 wherein the polyuronide polymer has a molecular weight of from about 2,000 Daltons to about 1,000,000 Daltons.

4. The method of claim 1 wherein the polyuronide polymer comprises an alginate polymer, a pectinate polymer, or combinations thereof.

5. The method of claim 4 wherein the pectinate polymer is methylated.

6. The method of claim 5 wherein the pectinate polymer has a degree of methylation of from about 50% to about 80%.

7. The method of claim 4 wherein the alginate polymer is chemically modified by esterification.

8. The method of claim 4 wherein the alginate polymer has a molecular weight of from about 14,000 Daltons to about 1,000,000 Daltons.

9. The method of claim 4 wherein the pectinate polymer has a molecular weight of from about 30,000 Daltons to about 1,000,000 Daltons.

10. The method of claim 4 wherein the pectinate polymer is a sodium salt or a potassium salt.

11. The method of claim 1 wherein the cementitious material comprises Portland cement, calcium aluminate cement, calcium oxide cement, class C flyash cements, cement kiln dust cements, or combinations thereof.

12. The method of claim 1 wherein the wellbore servicing fluid further comprises a conventional set retarder.

13. The method of claim 12 wherein the conventional set retarder comprises ligonosulfates copolymers of 2-acrylamido-2-methylpropane sulfonic acid with acrylic acid or itaconic acids, maltodextrins, sulfonated aromatic polymers, small molecule inorganic retarders, sodium tetraborate, or combinations thereof.

14. The method of claim 1 wherein the wellbore servicing fluid displays shear thinning behavior.

15. The method of claim 1 wherein the polyuronide polymer is water-soluble.

16. A method of servicing a wellbore in a subterranean formation comprising:

preparing a wellbore servicing fluid comprising a highly methylated pectin, cementitious material and water into the wellbore;

placing the wellbore servicing fluid in the wellbore; and allowing the wellbore servicing fluid to set wherein the wellbore servicing fluid has a thickening time of from about 1 hour to about 40 hours at a temperature of from about equal to or less than about 300° F.

17. The method of claim 16 wherein the highly methylated pectin is present in an amount of from about 0.1 wt. % to about 5.0 wt. % by weight of the wellbore servicing fluid.

18. The method of claim 16 further comprising a conventional retarder.

19. The method of claim 16 wherein the wellbore servicing fluid has a shear stress at a shear rate of 511 $sec^{-1}$ of equal to or less than about 150 Pa.

20. The method of claim 16 wherein the wellbore servicing fluid has a shear stress at a shear rate of 5.11 $sec^{-1}$ of equal to or greater than about 3 Pa.

21. The method of claim 16 wherein the polyuronide polymer is water-soluble.

22. A wellbore servicing fluid comprising cement, water and a polyuronide polymer wherein the wellbore servicing fluid has a thickening time of from about 1 hour to about 40 hours at a temperature of from about equal to or less than about 300° F.

23. The wellbore servicing fluid of claim 22 wherein the polyuronide polymer comprises an alginate polymer, a pectinate polymer, or combinations thereof.

24. The wellbore servicing fluid of claim 23 wherein the pectinate polymer is methylated.

25. The fluid of claim 22 wherein the polyuronide polymer is water-soluble.

\* \* \* \* \*